(12) United States Patent
Lee

(10) Patent No.: US 6,802,247 B1
(45) Date of Patent: Oct. 12, 2004

(54) ELECTRIC OVEN

(76) Inventor: Ming-Tsung Lee, P.O. Box 90, Tainan City (TW)

( * ) Notice: Subject to any disclaimer, the term of this patent is extended or adjusted under 35 U.S.C. 154(b) by 0 days.

(21) Appl. No.: 10/768,115

(22) Filed: Feb. 2, 2004

(51) Int. Cl.[7] .......................... A47J 37/00; A47J 37/04; A47J 37/08; A47J 37/10; A23L 1/00
(52) U.S. Cl. .................... 99/339; 99/427; 99/443 R; 99/448; 99/450; 219/388; 219/400
(58) Field of Search ................... 99/339, 340, 352–355, 99/426, 427, 443 R, 443 C, 419–421 V, 444–450, 483, 477–479, 467, 468; 219/388, 386, 400, 401, 494, 497; 126/369, 41 R, 25 R, 20

(56) References Cited

U.S. PATENT DOCUMENTS

| | | | | |
|---|---|---|---|---|
| 1,618,587 A | * | 2/1927 | Grady .......................... | 99/427 |
| 4,780,596 A | * | 10/1988 | Matsushima et al. ....... | 219/400 |
| 4,847,461 A | * | 7/1989 | Gilmore ..................... | 219/732 |
| 4,870,254 A | * | 9/1989 | Arabori et al. ............. | 219/400 |
| 5,216,947 A | * | 6/1993 | Cheng ......................... | 99/417 |
| 5,320,030 A | * | 6/1994 | Hubbard ...................... | 99/423 |
| 5,473,979 A | * | 12/1995 | Ruben .......................... | 99/446 |
| 5,974,953 A | * | 11/1999 | Messerli ...................... | 99/340 |
| 6,082,249 A | * | 7/2000 | Su .............................. | 99/340 |
| 6,279,465 B1 | * | 8/2001 | English ....................... | 99/339 |
| 6,443,053 B1 | * | 9/2002 | Rossi ......................... | 99/340 |
| 6,512,208 B1 | * | 1/2003 | Bergman ................... | 219/400 |
| 6,619,189 B1 | * | 9/2003 | Tippmann et al. ........... | 99/330 |

* cited by examiner

Primary Examiner—Timothy F. Simone

(57) ABSTRACT

An electric oven includes a housing having a door at a front, a chamber in an interior and a motor at a bottom; rotating devices installed in the housing and each consisting of an upper frame, a lower frame, roller seat assemblies, a gear wheel, a driven shaft and a driven gear; and, net racks capable of being rested on the gear wheels. In using, the motor is actuated to turn the driven shafts and gears to synchronously rotate the gear wheels to make the net racks rotated accordingly for roasting food articles evenly. The rotating devices designed to be located in multiple layers can be placed with various food articles, thus enabling one single electric oven to roast the various food articles at the same time. A pan can be rested on the rotating device that is positioned at a top layer for frying, roasting, boiling and deep-frying.

4 Claims, 5 Drawing Sheets

ELECTRIC OVEN

BACKGROUND OF THE INVENTION

1. Field of the Invention

This invention relates to an electric oven, particularly to one including a housing having a door disposed at a front thereof, a chamber formed in an interior thereof and a motor mounted at a bottom thereof; a plurality of rotating devices capable of being installed in the housing and each of the rotating devices consisting of an upper frame, a lower frame, a plurality of roller seat assemblies, a gear wheel, a driven shaft and a driven gear; and, a plurality of net racks capable of being rested on the gear wheels of the plurality of rotating devices. When in use, the motor may be switched on to actuate the plurality of rotating devices by turning the driven shafts and the driven gears to synchronously rotate the gear wheels that are meshed with the driven gears to make the plurality of net racks rotated accordingly for baking or roasting food articles evenly. Moreover, the rotating devices designed to be positioned in multiple layers can be placed with various food articles thereon, thus enabling the various food articles to be baked or roasted in one single electric oven at the same time. In addition, a pan can be rested on the rotating device that is positioned at a top layer for various uses in frying, baking, roasting, boiling and deep-frying.

2. Description of the Prior Art

Generally speaking, a known conventional electric oven 1, as shown in FIG. 1, has heating elements 11 disposed in a bottom or an interior thereof, and roasting racks 10 located therein for being placed with food articles capable of being baked or roasted by electric heats of the heating elements 11. However, the roasting racks 10 are designed to be stationary on the heating elements 11 so that the food articles also remain unmoving on the roasting racks 10. Under the situation, both sides of the food articles may receive uneven heats in backing or roasting: one sides of the food articles that are close to the heating elements 11 will be heated with higher temperature, but the other sides of the food articles that are far from the heating elements 11 will be heated with lower temperature, thus resulting in bad baking or roasting effects. In order to overcome the defect, a user needs to open the conventional electric oven 1 to turn over the food articles from time to time. Moreover, the conventional electric oven 1 is inconvenient to bake or roast various food articles that are different in materials, thickness, and sizes at a time because the various food articles requires different heating temperatures and times; therefore, it is very troublesome for the user to bake or roast the various food articles for many times.

SUMMARY OF THE INVENTION

It is a primary object of the present invention to offer an electric oven that can be used to bake or roast food articles evenly by turning a plurality of rotating devices to make a plurality of net racks rotated accordingly.

It is another object of the present invention to offer an electric oven having a plurality of rotating devices designed to be located in multiple layers and capable of being placed with various food articles thereon, thus enabling the various food articles to be baked or roasted in one single electric oven at the same time.

It is a further object of the present invention to offer an electric oven having a pan located on an upper portion of a housing for various uses in frying, baking, roasting, boiling and deep-frying, thus providing the electric oven with multiple functions in use.

One primary feature of the present invention is to provide an electric oven mainly including:

a housing having a door disposed at a front thereof, a chamber formed in an interior thereof and a motor mounted at a bottom thereof;

a plurality of rotating devices capable of being installed in the housing, each of the rotating devices consisting of an upper frame, a lower frame, a plurality of roller seat assemblies, a gear wheel, a driven shaft and a driven gear; and, a plurality of net racks capable of being rested on the gear wheels of the plurality of rotating devices.

One another feature of the present invention is to provide an electric oven having a pan capable of being rested on a gear wheel of a rotating device that is positioned at a top layer.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
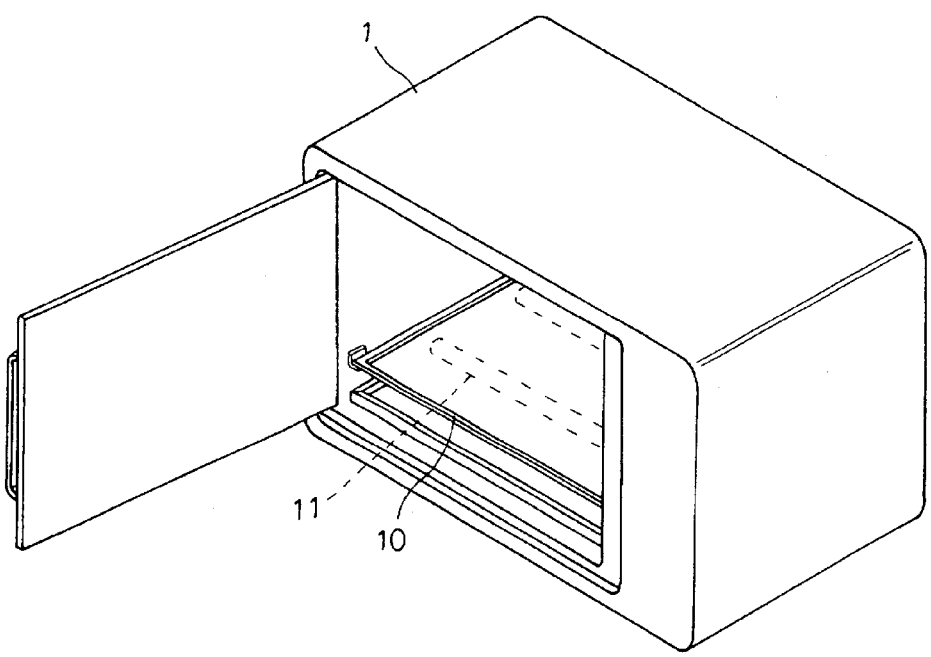
FIG. 1 is a perspective view of a known conventional electric oven.
Figure 2:
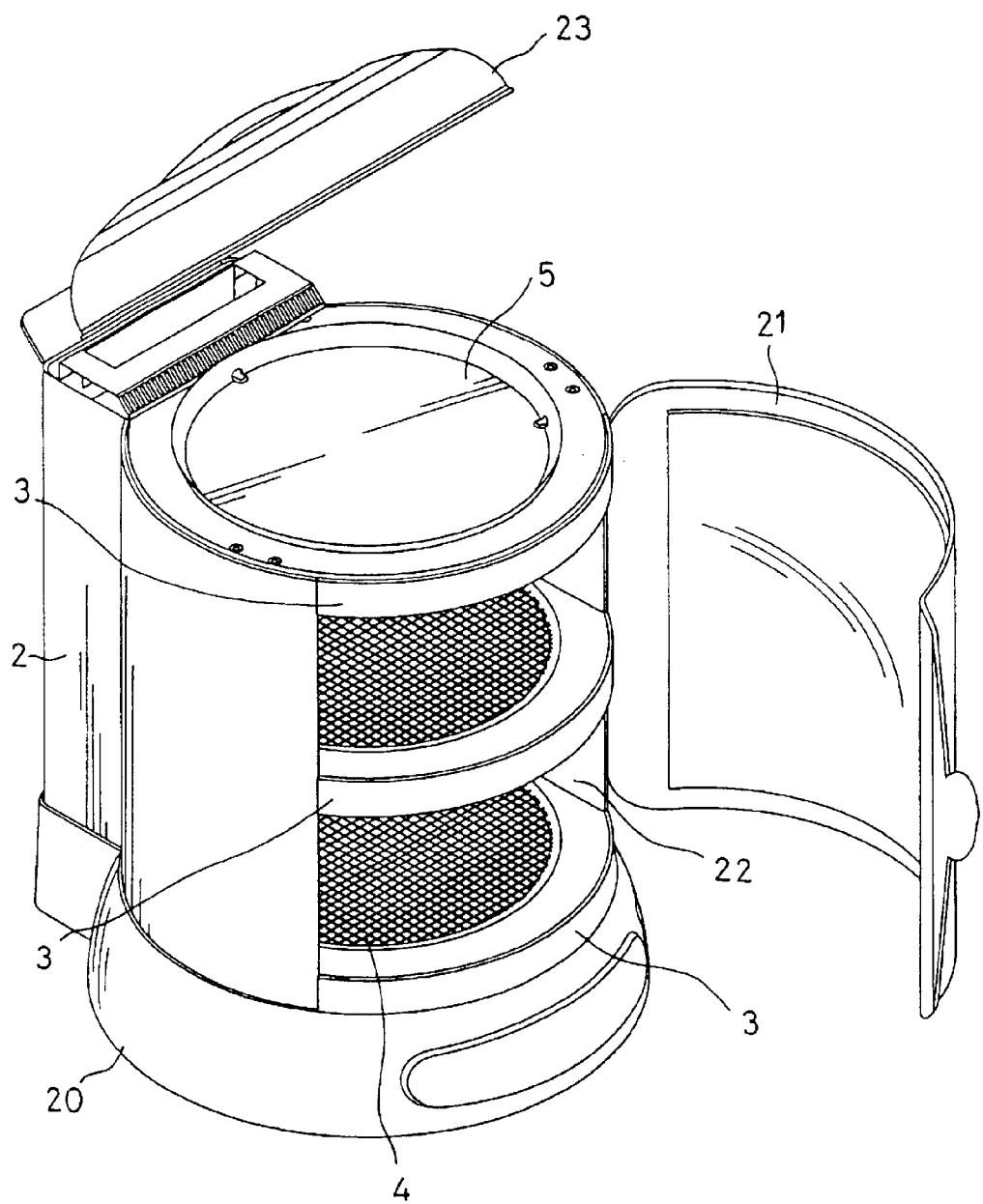
FIG. 2 is a perspective view of an electric oven in the present invention.
Figure 3:
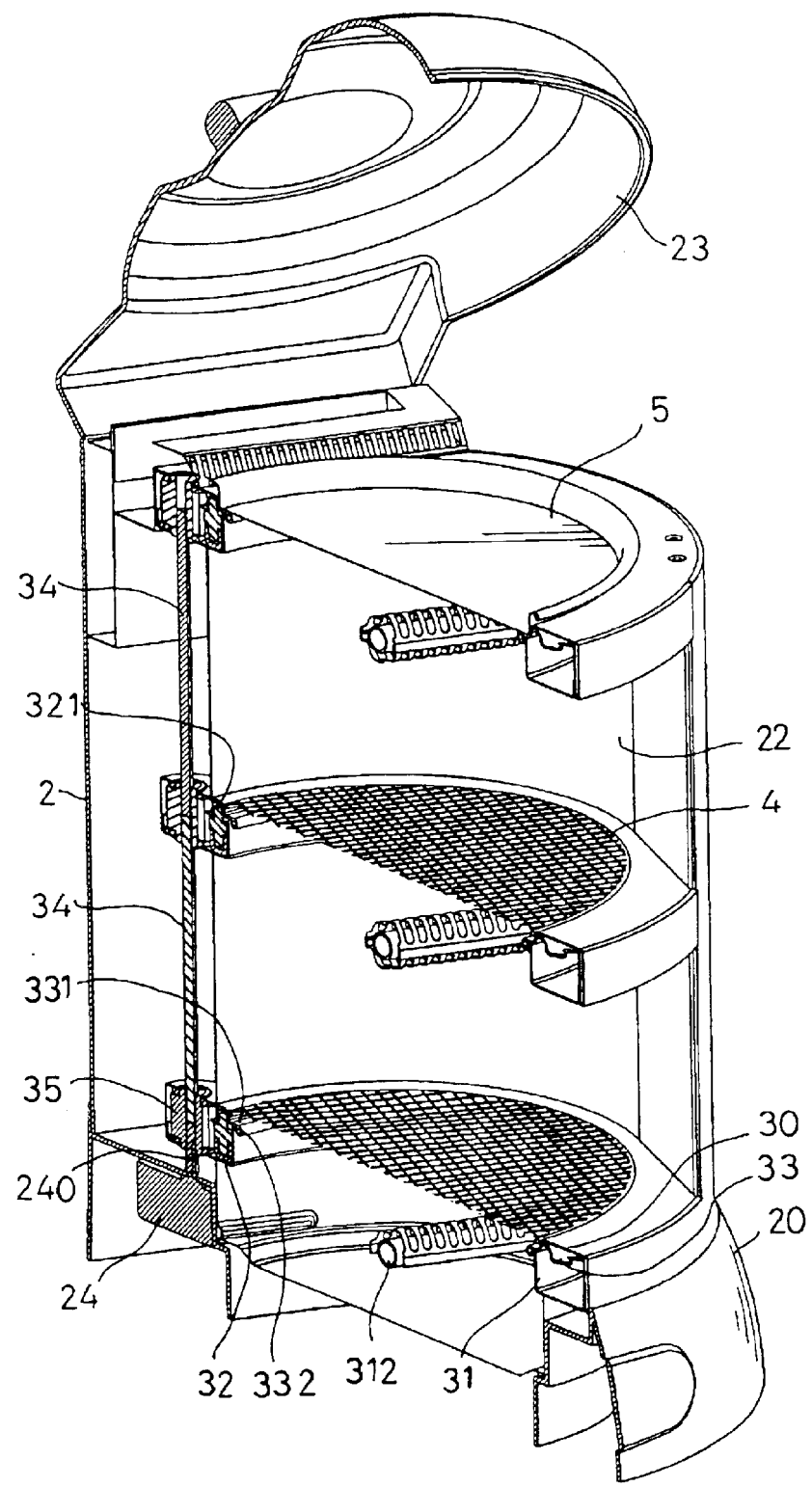
FIG. 3 is a sectional view of the electric oven in the present invention.
Figure 4:
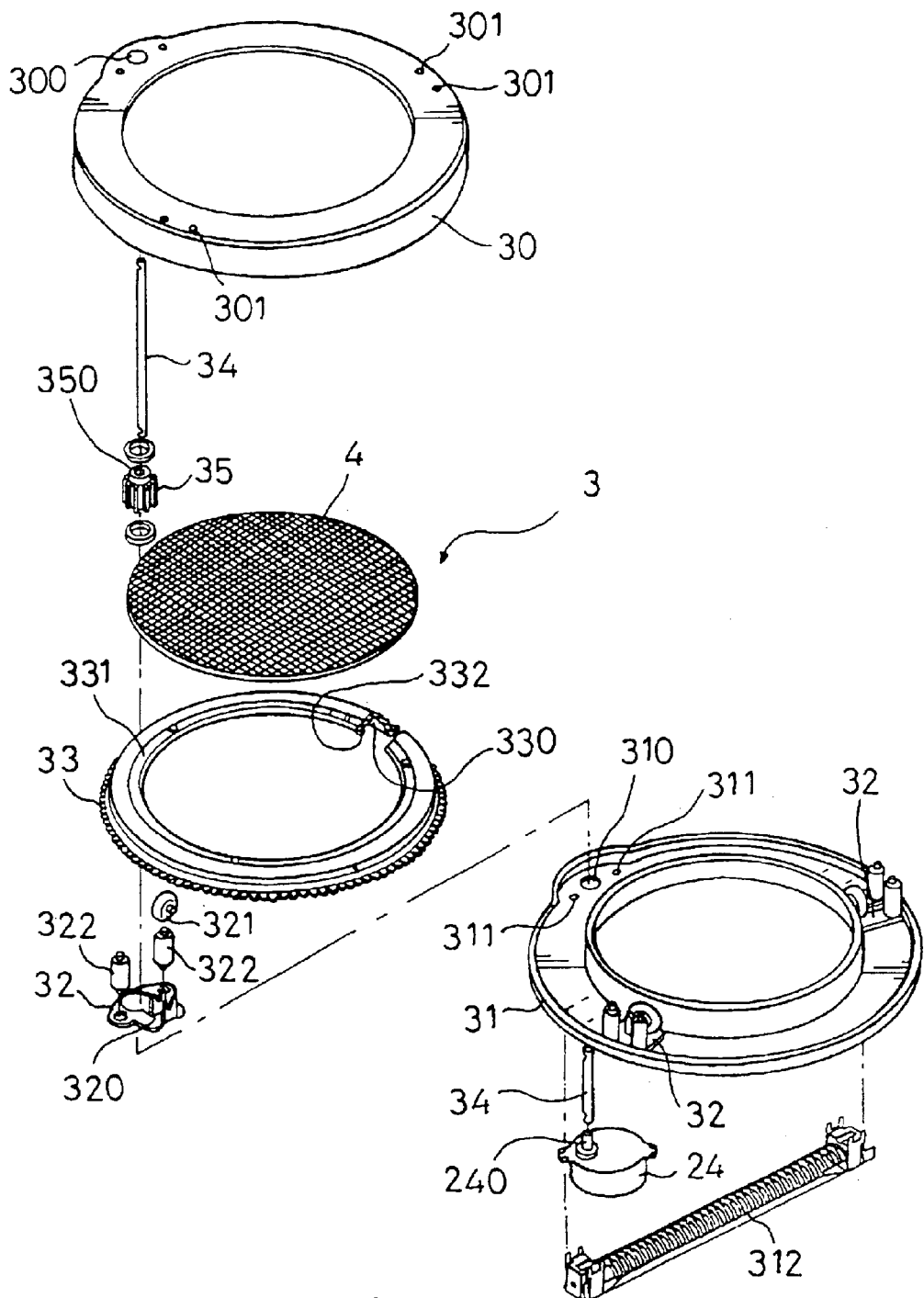
FIG. 4 is an exploded perspective view of a rotating device of the electric oven in the present invention; and, FIG. 5 is a top sectional view showing an assemblage of the rotating device of the electric oven in the present invention.
Figure 5:
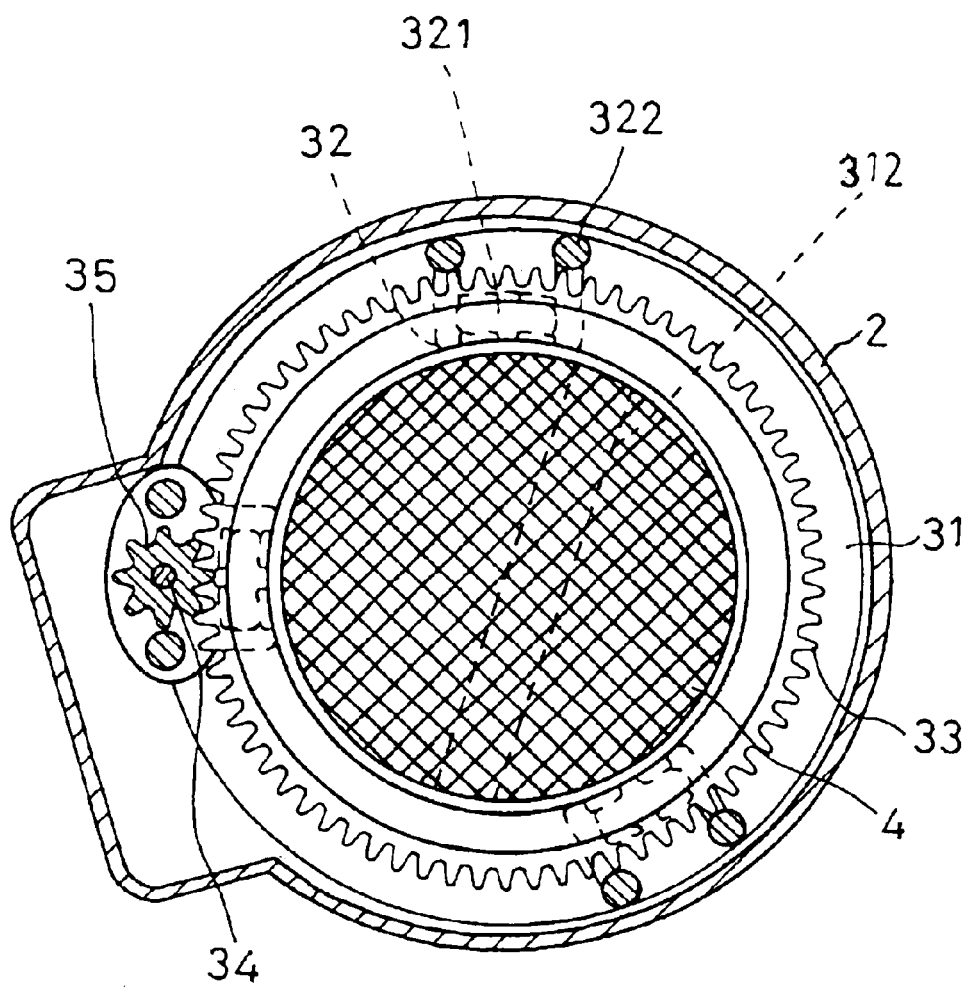

A preferred embodiment of an electric oven in the present invention, as shown in FIGS. 2 to 5, mainly includes a housing 2, a plurality of rotating devices 3 and a plurality of net racks 4.

The housing 2 has a base 20 disposed at a bottom thereof, a door 21 disposed at a front thereof, a chamber 22 formed in an interior thereof, an upper lid pivoted at one side of an upper opening thereof and a motor 24 mounted at the bottom thereof. The motor 24 is provided with an axle 240 protruded upwards.

Each of the rotating devices 3 capable of being installed in the housing 2 mainly includes an upper frame 30, a lower frame 31, a plurality of roller seat assemblies 32, a gear wheel 33, a driven shaft 34 and a driven gear 35.

The upper and lower frames 30, 31 capable of being securely fixed in the housing 2 both have a bore 300, 310 formed therethrough in a position opposite to each other and a plurality of combining holes 301, 311 formed in positions opposite to each others. A heating element 312 is mounted on a bottom surface of the lower frame 31 and designed to have its electric heat source distributing weaker in a central portion thereof and gradually stronger toward both ends thereof.

Each of the plurality of roller seat assemblies 32 capable of being combined on the lower frame 31 has a groove 320 for accommodating a roller 321, and at least one supporting post 322 correspondingly combined with the plurality of combining holes 301, 311 of the upper and lower frames 30, 31 for ensuring a certain distance to be permanently sustained between the upper and lower frames 30, 31.

The gear wheel 33 capable of being rested on the lower frame 31 has a rail 330 for correspondingly receiving an outer periphery of the rollers 321 of the roller seat assemblies 32 therein, a circumferential lip 331 disposed in an inner periphery of a hollow center thereof, and a stop edge 332 curved inwardly from an inner periphery of the circumferential lip 331 for being stopped against an inner side of the lower frame 31.

The driven shaft 34 capable of extending through the upper and lower frames 30, 31 may be turned by the motor 24.

The driven gear 35 provided with a hole 350 therein is securely sleeved on an appropriate place of the driven shaft 34 and meshed with the gear wheel 33.

The plurality of net racks 4 can be rested on the gear wheels 33 of the rotating devices 3 with their periphery just rested against the circumferential lips 331 of the gear wheels 33 for being placed with food articles to be baked or roasted thereon.

In addition, a pan 5 can be rested on the gear wheel 33 of the rotating device 3 that is positioned at a top layer for various uses in frying, baking, roasting, boiling and deep-frying.

In assembling, each of the rotating devices 3 can be assembled as follows:

Firstly, the plurality of roller seat assemblies 32 are combined onto predetermined places of the lower frame 31.

Secondly, the gear wheel 33 is placed on the lower frame 31 with an outer periphery of the rollers 321 of the plurality of roller seat assemblies 32 received in the rail 330.

Thirdly, the hole 350 of the driven gear 35 is aligned with the bore 310 of the lower frame 31 to allow the driven shaft 34 to extend therethrough, and the driven gear 35 is mashed with the gear wheel 33.

Finally, the upper frame 30 is covered on the gear wheel 33 and the lower frame 31, and then the supporting posts 322 of the roller seat assemblies 32 are screwed with the upper frame 30 tightly, by which the plurality of supporting posts 322 can ensure a certain distance to be permanently sustained between the upper and lower frames 30, 31 for allowing the rotation of the gear wheel 33 therebetween.

Each of the rotating devices 3 can be installed in the housing 2 with the upper and lower frames 30, 31 securely affixed to the housing 2 and with the driven shaft 34 connected with the axle 240 of the motor 24 that is disposed at the bottom of the housing 2, by which the net rack 4 or the pan 5 can be rested on the gear wheel 33 for being placed with a food article to be baked or roasted thereon.

In using, the motor 24 may be switched on to actuate the plurality of rotating devices 3 by turning the driven shafts 34 and the driven gears 35 that are securely sleeved on the driven shaft 34 to synchronously rotate the gear wheels 33 that are meshed with the driven gears 35 to make the pan 5 or the net racks 4 that are rested on the gear wheel 33 rotated accordingly for baking or roasting the food articles evenly.

The invention has the following advantages, as can be understood from the aforesaid description.

1. The electric oven of the present invention can bake or roast the food articles that are placed on the pan 5 or the net racks 4 evenly by switching on the motor 24 to actuate the rotating devices 3 to turn the gear wheels 33 to synchronously rotate the pan 5 or the net racks 4 that are rested on the gear wheels 33.

2. The door 21 of the present invention can be equipped with a transparent window for the convenience of viewing the baking or roasting condition of the food articles placed on the pan 5 or the net racks 4 from the outside of the electric oven.

3. The net rack 4 that is rested on the rotating device 3 positioned at a top layer may be replaced with the pan 5, and the upper lid 23 pivoted at the top of the housing 2 is convenient for closing or opening the pan 5 in frying, roasting, boiling and deep frying, thus providing the electric oven with multiple functions in use.

4. The plurality of the rotating devices 3 are designed to be positioned in multiple layers for being placed with various food articles that are different in materials, thickness, and sizes, thereby enabling the various food articles that require different heating temperatures and times to baked or roasted in one single electric oven at the same time, thus increasing the convenience and the utility of the electric oven.

While the preferred embodiment of the invention has been described above, it will be recognized and understood that various modifications may be made therein and the appended claims are intended to cover all such modifications that may fall within the spirit and scope of the invention.

What is claimed is:

1. An electric oven comprising:

a housing having a door disposed at a front thereof, a chamber formed in an interior thereof and a motor mounted at a bottom thereof;

a plurality of rotating devices capable of being installed in said housing, each of said rotating devices consisting of an upper frame, a lower frame, a plurality of roller seat assemblies, a gear wheel, a driven shaft and a driven gear;

a plurality of net racks capable of being rested on said gear wheels of said plurality of rotating devices; and, whereby when in use, said motor may be switching on to actuate said plurality of rotating devices by turning said driven shafts and said driven gears to synchronously rotate said gear wheels that are meshed with said driven gears to make said plurality of net racks rotated accordingly for baking or roasting food articles evenly; and said plurality of rotating devices designed to be positioned in multiple layers can be placed with various food articles thereon, thus enabling said various food articles to be baked or roasted in one single said electric oven at the same time.

2. The electric oven as claimed in claim 1, wherein said housing has an upper lid disposed at a top thereof.

3. The electric oven as claimed in claim 1, wherein said upper and lower frames of each of said rotating devices both have a bore formed therethrough in a position opposite to each other and a plurality of combining holes formed in positions opposite to each others;

wherein said plurality of roller seat assemblies of each of said rotating devices are disposed in said lower frame of each of said rotating devices, and each of said roller seat assemblies has a groove for accommodating a roller and at least one supporting post correspondingly combined with said plurality of combining holes of said upper and lower frames of each of said rotating devices for ensuring a certain distance to be permanently sustained between said upper and lower frames;

wherein said gear wheel of each of said rotating devices capable of being rested on said lower frame of each of said rotating devices has a rail for correspondingly receiving an outer periphery of said rollers of said plurality of roller seat assemblies therein;

wherein a heating element is mounted on a bottom surface of said lower frame of each of said rotating devices;

wherein said driven shaft of each of said rotating devices capable of extending through said upper and lower frames of each of said rotating devices may be turned by said motor; and, wherein said driven gear of each of said rotating devices is securely sleeved on said driven shaft of each of said rotating devices and meshed with said gear wheel of each of said rotating devices.

4. The electric oven as claimed in claim 1, wherein said net rack that is rested on said gear wheel of said rotating device positioned at a top layer may be replaced with a pan for various uses in frying, roasting, boiling and deep frying.

* * * * *